Figure 6:
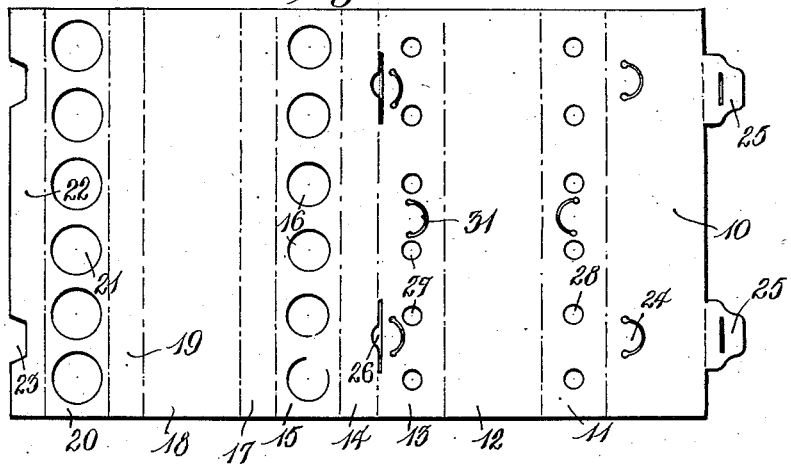

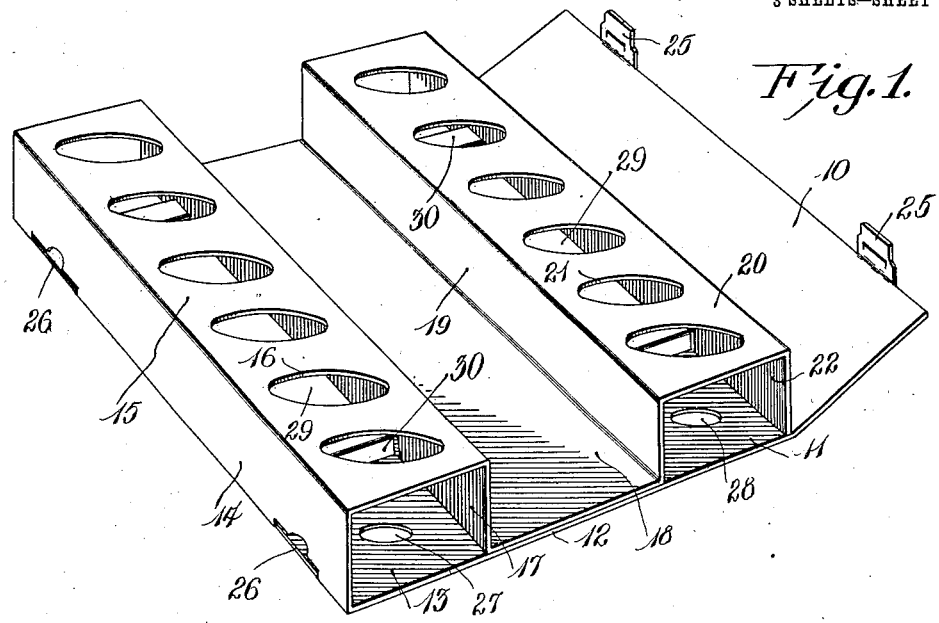
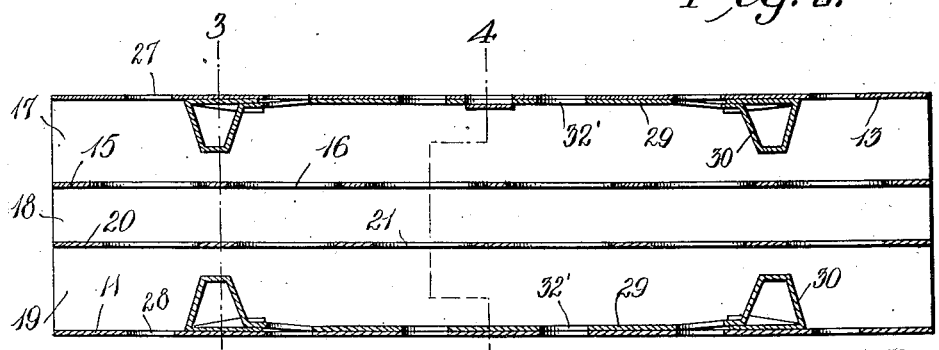
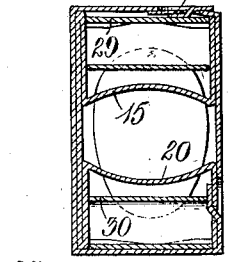
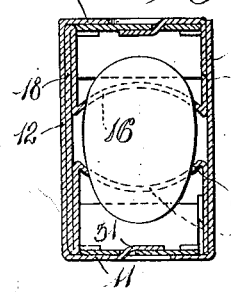
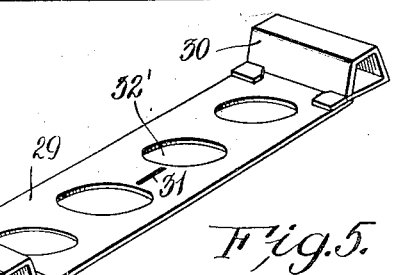

J. A. HILLIKER.
EGG CRATE.
APPLICATION FILED JULY 14, 1908.

915,294.

Patented Mar. 16, 1909.
3 SHEETS—SHEET 2.

Witnesses
C. E. Smith.
S. E. Dodge.

Inventor
J. A. Hilliker
By Beeler & Cobb
Attorneys

J. A. HILLIKER.
EGG CRATE.
APPLICATION FILED JULY 14, 1908.
915,294.
Patented Mar. 16, 1909.
3 SHEETS—SHEET 3.
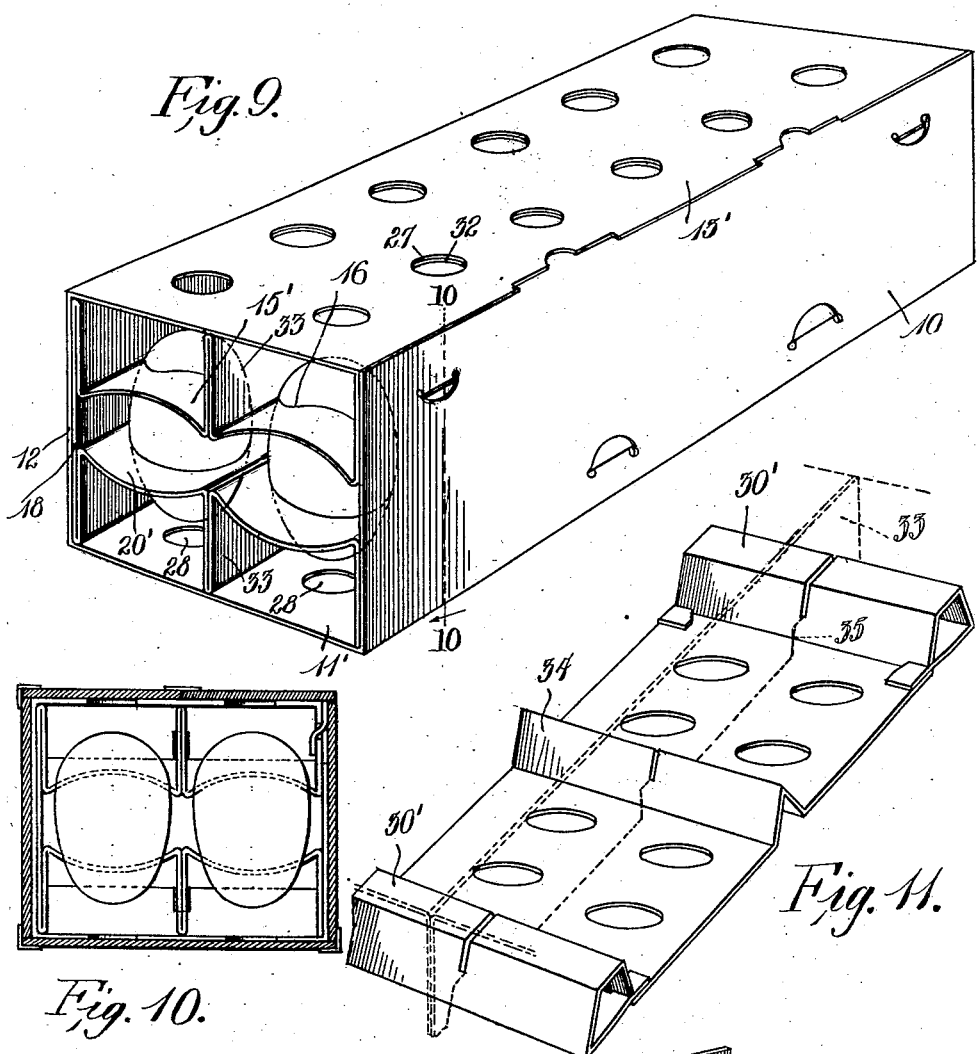
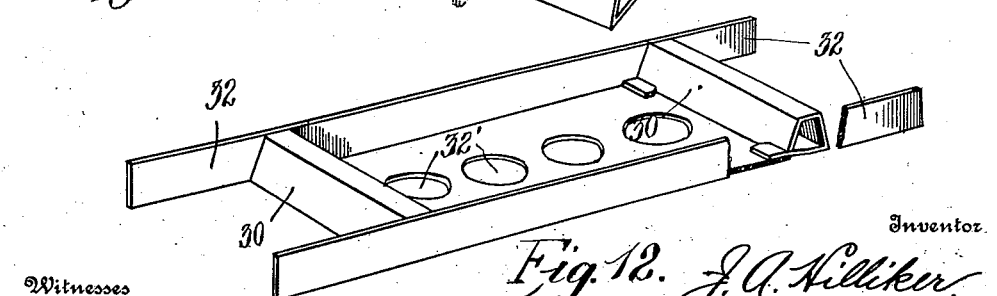
Witnesses
S. E. Dodge.
N. J. Keim
Inventor
J. A. Hilliker,
By Beeler & Cobb
Attorneys

UNITED STATES PATENT OFFICE.

JOHN A. HILLIKER, OF CHICAGO, ILLINOIS.

EGG-CRATE.

No. 915,294.     Specification of Letters Patent.    Patented March 16, 1909.

Application filed July 14, 1908. Serial No. 443,530.

*To all whom it may concern:*

Be it known that I, JOHN A. HILLIKER, a citizen of the United States, residing at Chicago, in the county of Cook and State of Illinois, have invented certain new and useful Improvements in Egg-Crates, of which the following is a specification.

This invention relates to that class of packing and storing vessels designed for the handling of eggs, and has particular reference to fillers for egg crates having numerous peculiar advantages, as will hereinafter fully appear.

For a proper and more successful handling of eggs it is essential that the eggs be not touched or handled individually from the time they are packed until they are used, regardless of the number of hands through which the receptacles containing them may be obliged to pass. Again, it is important that the eggs be packed in such a manner that the packages or receptacles in which they are contained be sealed, the seal bearing the name of the packer and date. It is important also that such packages or receptacles containing the eggs be provided with ample air spaces, and especially with openings so arranged as to permit of candling while the eggs are thus secured in packages. It will be understood that the packages referred to may be easily handled while preventing contact of the hand with any of the eggs contained thereby. Furthermore, it is exceedingly important that all of the eggs, individually considered, shall be supported in some positive manner whereby the crate in which the packages or fillers are contained may be inverted and yet insuring that every egg will be inverted likewise. It is well known that in preserving eggs in cold storage it is conducive to the best results if the eggs are turned from time to time to prevent settling. In crates having fillers of ordinary types to invert the crate does not insure that the eggs will be likewise inverted.

A still further object of the present invention is to support the individual eggs in flexible cushions, and at the same time space them from the walls of the container so as to reduce possibility of crushing to the minimum.

In carrying out the foregoing objects I make use of egg cases or receptacles adapted to be used in connection with egg crates of ordinary size, such cases or receptacles being made of a cheap quality of paste board or other suitable material which may be provided at a very low cost.

For a full understanding of the invention, including its construction and means for carrying out the foregoing and other objects, reference is to be had to the following detail description and the accompanying drawings, in which—

Figure 7:
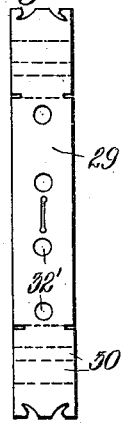
Figure 8:
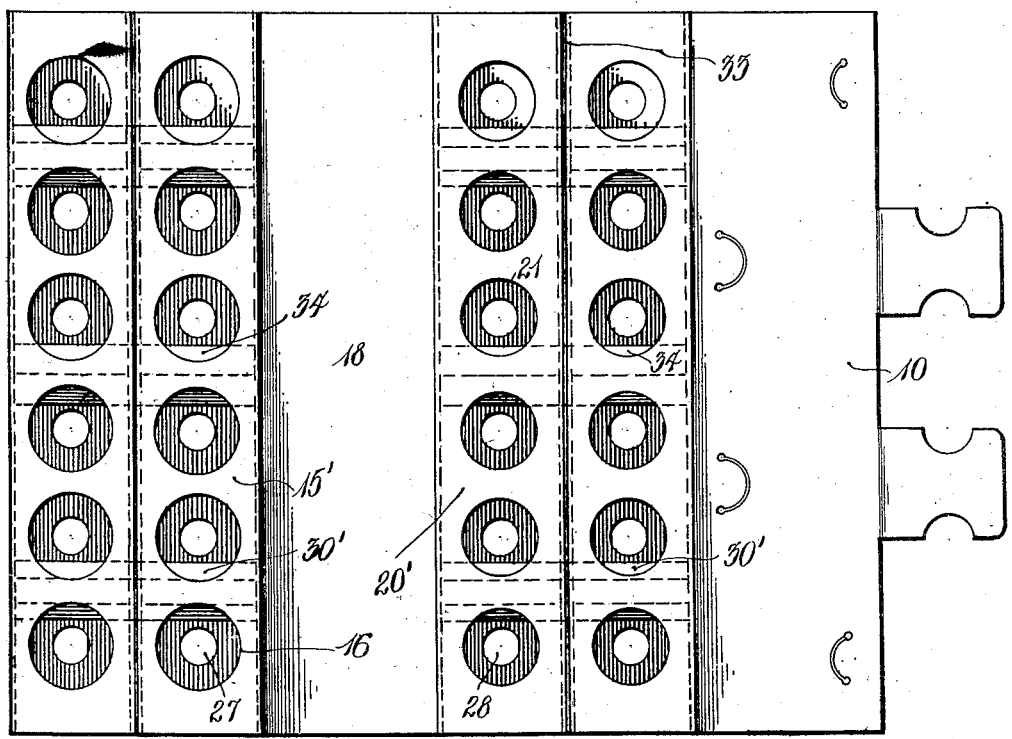

Figure 1 is a perspective view; Fig. 2 is a vertical longitudinal sectional view; Fig. 3 is a transverse sectional view on the line 3—3 of Fig. 2; Fig. 4 is a transverse sectional view on the line 4—4 of Fig. 2; Fig. 5 is a detail perspective of one of the brace members; Fig. 6 is a plan view of the blank from which the case is made; Fig. 7 is a view of the blank from which each brace member is made; Fig. 8 is a plan view of a modified form of egg case in open position ready to receive the eggs; Fig. 9 is a perspective view of the modification shown in Fig. 8; Fig. 10 is a transverse section on the line 10—10 of Fig. 9, showing the means for closing the same; Fig. 11 is a perspective view of one of the brace members used in the modified construction, and Fig. 12 is a perspective view of another form of brace member.

Throughout the following detail description and on the several figures of the drawings similar parts are referred to by like and corresponding reference characters.

In carrying out this invention in its practical embodiment, I prefer to construct the case or filler essentially of a single blank, although it is to be understood that in many particulars the invention is well adapted for use in connection with structures wherein more than a single blank may be employed.

Referring particularly to Fig. 1 wherein is illustrated an open case designed for the reception of one half dozen eggs, there is illustrated a device formed essentially from a single blank bent or folded laterally upon itself so as to form continuous side walls 10, 11, 12, and 13, the said walls 11 and 13 being considered for convenience the bottom and top respectively of the case when closed. The side walls being continuous from top to bottom of the case constitute substantial braces to prevent torsion or crushing strains from damaging the case and contents, and yet permitting of use of comparatively light and cheap stock. Again, said side walls snugly embrace and strengthen the interior structure, hereinafter fully set forth. A portion of one end of the said blank is folded laterally over upon the other portions and so bent on itself as to form a filler comprising two box-like spaced socket members wherein the ends of the eggs are received when the case is closed. One of said socket members is comprised of the blank portions 14, 15, and 17, the member 15 being flexible and having a series of sockets 16 for the larger ends of the eggs. A spacing member or inner wall 18 extends between the said socket members. The other socket member is composed of the blank members 19, 20, and 22, the member 20 being flexible and being provided with a series of sockets 21 for the small ends of the eggs. It is preferred to construct the holes 16 and 21 of sizes differing in accordance with the difference in the diameters of the ends of the eggs so as to provide that the eggs will extend into the respective sockets substantially to the same extent and thereby space the eggs equally at both ends from the top and bottom of the case. The blank member 22 may be notched if desired at 23 to provide an interlock for the tongues 24 cut into the portion 10.

Any convenient or suitable means may be provided for locking the case closed after being filled. As herein shown the member 10 is provided with outwardly projecting tongues 25 adapted to enter slits 26 substantially at the line of connection between the portions 13 and 14. After being filled and locked the packer may apply a label with his name and date, sealing the receptacle, if he so desires.

Thus far described and with reference to Fig. 2 it will be seen that the eggs are spaced from one another and each egg is not only supported in flexible cushioning members but it is spaced a sufficient distance from the top, bottom, and side walls of the container.

In addition to the holes or sockets 16 and 21 for the reception of the eggs, the blank will be provided with a number of peep-holes 27 and 28 which register with the sockets 16 and 21 respectively when the case is open ready to be filled and which will all aline with the longer axes of the eggs when the case is closed. These peep-holes insure proper ventilation of the packed eggs, and also provide for a ready means for candling the eggs while in the packages.

If the material from which the cases are made is not sufficiently rigid, it may be desirable to provide internal bracing means, made of any suitable material. By the use of suitable bracing means the material from which the main case is constructed may be comparatively light. The brace structure is of comparatively small size and may be made of heavier material so as to provide sufficient rigidity for the receptacle. I preferably provide a brace member within and extending longitudinally of each of the socket members above described. As a convenient form of such brace member I provide a web 29 of substantially the same width as the interior of its socket member and whose ends are folded over upon themselves to provide the brace bars 30. It will be seen that the bars 30 are of sufficiently less depth than the width of the connecting webs of the socket members to permit an ample amount of flexibility of the flexible portions of the socket members 15 and 21, thus providing for the accommodation of eggs of varying sizes. The brace member, both as to its web and the bars strengthens the case and prevents any tendency to crush the eggs laterally.

In Fig. 12 is illustrated a slightly modified form of the brace member wherein it is provided with lateral flanges 32 bent at right angles to the main portion or web and which edge portions are cut from those portions of the brace which are bent over to form the brace bars. This form of the device gives additional bracing or strengthening effect to the lateral or connecting webs of the respective socket members. In all forms of the brace members they may be secured temporarily in place by any convenient means. As shown in this form of the invention there is a simple form of interlock between the outer wall of the case and the brace member web, indicated at 31. The brace members will be provided with holes 32' which will aline with the corresponding peep-holes of the casing.

In the form of the invention illustrated in Fig. 8 a case or receptacle is provided for the accommodation of twelve eggs, but in all essential particulars this form corresponds to the form hereinbefore set forth. The portions 10, 12, 14, 17, 18, 19, and 22, mentioned, correspond to the similar parts of the first structure. The portions 11', 13', 15', and 20', however, differ in having double the number of sockets and peep-holes as the corresponding elements in the first structure. The flexible members 15' and 20' of the filler in this modification, being wider than in the smaller size, are each preferably reinforced or braced by being folded upon itself centrally to provide a laterally integral longitudinal extending rib 33. The brace members in the larger sized construction embody all of the features of the corresponding members of the smaller sized construction. The web, however, of this form is preferably crimped at an intermediate portion as at 34 to provide not only additional rigidity in a transverse direction but also an additional means for temporarily securing it in place. In this form of the device the crimp 34 and the brace bars 30' are all notched to interlock with the rib 33, said rib being notched at 35, for this purpose.

As a convenient means for filling and closing these egg receptacles or cases, I provide a peculiar form of a device illustrated in Fig. 10. This device includes a number of rigid members suitably hinged each to each and upon which the case in its open position is placed preparatory to filling. The eggs being put into their sockets, preferably in the sockets 21, that portion of the closing device which lies beneath the empty socket member will be lifted bringing that latter mentioned member over upon the eggs already placed, after which the locking means for the case will be properly placed. It will thus be seen that no pressure is brought by the hands upon any portion of the case tending to distort or injure it during the filling operation.

Numerous modifications in detail construction in reference to the invention may be resorted to within the spirit thereof and within the scope of the claims hereinafter made.

Having thus described the invention, what is claimed as new, is:

1. An egg case comprising a body, and a filler composed of egg supporting members in said body, the sides of the body and the egg supporting members of the filler being formed by continuous portions of a unitary blank folded in one direction.

2. As an article of manufacture, an egg case comprising a blank folded upon itself to form inclosing sides, and having an integral portion folded additionally into box folds parallel with the sides and inclosed by said sides, said box folds being spaced and comprising an egg supporting filler.

3. An egg case consisting of a blank the body of which is folded laterally to form continuous inclosing bracing walls of an egg compartment, and a portion of which is folded upon the body to form a filler in said compartment, said filler being composed of spaced walls provided with egg receiving seats.

4. An egg case consisting of a blank the body of which is folded laterally to form inclosing top, bottom, and continuous vertical bracing side walls of an egg compartment, and a portion of which is folded upon the body to form a filler in said compartment, said filler being composed of spaced walls provided with openings forming seats for the eggs, and the adjacent top and bottom of the case having openings in line with those of the filler, for the purposes set forth.

5. An egg case consisting of a blank the body of which is folded laterally to form inclosing top, bottom, and bracing side walls of an egg compartment, and a portion of which is folded upon the body to form a filler, said filler being comprised of box folds in a portion of the blank, the outer sides of said box folds being arranged in spaced relation to form egg supporting walls and having seats for the eggs, the sides of the box folds extending to the top and bottom of the case against said bracing side walls and forming spacing elements for maintaining the egg supporting walls in proper relation.

6. An egg case consisting of a blank the body of which is folded to form inclosing walls of an egg compartment, and a portion of which is folded upon the body to form a filler in said compartment, said filler being composed of spaced walls provided with egg receiving seats, and auxiliary members in the case constituting longitudinal and transverse braces therefor.

7. An egg case consisting of a blank the body of which is folded to form inclosing walls of an egg compartment, and a portion of which is folded upon the body to form a filler, said filler being comprised of box folds in a portion of the blank, the outer sides of said box folds being arranged in spaced relation to form egg supporting walls and having seats for the eggs, and brace members between the sides of the box folds serving to prevent lateral crushing of the case.

8. An egg case consisting of a blank the body of which is folded to form inclosing walls of an egg compartment, and a portion of which is folded upon the body to form a filler, said filler being comprised of box folds in a portion of the blank, the outer sides of said box folds being arranged in spaced relation to form egg supporting walls and having seats for the eggs, and brace members between the sides of the box folds and having end reinforcements formed by bending the ends thereof upon themselves and interlocking them with the bodies of the said members.

9. An egg case comprising a shell and a filler within the shell serving to support the eggs in upright position and spaced from one another and from the walls of the shell, said filler including flexible members having spaced egg sockets, each of said flexible members being unitary from side to side of the case and provided with an intermediate integral longitudinal strengthening rib.

10. An egg case comprising a shell and a filler within the shell serving to support the eggs in upright position and spaced from one another and from the walls of the shell, said filler including flexible members having spaced egg sockets, each of said flexible members being provided with a longitudinal strengthening rib, and a brace member co-operating with each of said longitudinal ribs and serving to prevent crushing of the case and contents.

In testimony whereof I affix my signature in presence of two witnesses.

JOHN A. HILLIKER.

Witnesses:
 THOS. M. DILL,
 J. W. BICKFORD.